US012700605B2

(12) United States Patent
Jang et al.

(10) Patent No.: US 12,700,605 B2
(45) Date of Patent: Aug. 4, 2026

(54) FUEL CELL SYSTEM

(71) Applicant: LG ELECTRONICS INC., Seoul (KR)

(72) Inventors: Heejoong Jang, Seoul (KR); Hyoungsuk Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 848 days.

(21) Appl. No.: 17/976,074

(22) Filed: Oct. 28, 2022

(65) Prior Publication Data

US 2023/0148377 A1 May 11, 2023

(30) Foreign Application Priority Data

Nov. 8, 2021 (KR) ......................... 10-2021-0152589

(51) Int. Cl.
| | |
|---|---|
| *H01M 8/04701* | (2016.01) |
| *H01M 8/04082* | (2016.01) |
| *H01M 8/04089* | (2016.01) |
| *H01M 8/04223* | (2016.01) |
| *H01M 8/04746* | (2016.01) |

(Continued)

(52) U.S. Cl.
CPC ..... *H01M 8/1233* (2013.01); *H01M 8/04089* (2013.01); *H01M 8/04738* (2013.01); *H01M 8/04776* (2013.01); *H01M 8/2484* (2016.02)

(58) Field of Classification Search
CPC ........... H01M 8/1233; H01M 8/04089; H01M 8/04738; H01M 8/04776; H01M 8/2484;

(Continued)

(56) References Cited

U.S. PATENT DOCUMENTS 6,165,633 A * 12/2000 Negishi .................. B01J 8/0285
429/408
9,698,441 B2 * 7/2017 Ogawa .................... B01J 8/067

(Continued)

FOREIGN PATENT DOCUMENTS

JP       2000-208159       7/2000
JP       2004-47260        2/2004

(Continued)

OTHER PUBLICATIONS

Korean Office Action dated Nov. 10, 2023 issued in Korean Patent appl. No. 10-2021-0152589.

(Continued)

*Primary Examiner* — Christian Roldan
(74) *Attorney, Agent, or Firm* — KED & ASSOCIATES, LLP

(57) ABSTRACT

A fuel cell system may include: a reformer performing a reforming process of producing hydrogen gas from a gasified fuel; a burner supplying heat to the reformer; a stack generating electrical energy by generating an electrochemical reaction using reforming gas and air discharged from the reformer; a first supply pipe supplying external air to the burner; a second supply pipe supplying external air to the stack; a first storage tank storing a liquid fuel; a second storage tank supplying a gasified fuel to the reformer; and a fuel evaporator making a liquid fuel discharged from the first storage tank exchange heat with air flowing through the first supply pipe or air flowing through the second supply pipe, and sending a gasified gaseous fuel to the second storage tank.

13 Claims, 14 Drawing Sheets

(51) Int. Cl.
   *H01M 8/1233*        (2016.01)
   *H01M 8/2484*        (2016.01)
(58) Field of Classification Search
   CPC .............. H01M 8/04; H01M 8/04201; H01M
           8/04302; H01M 2250/20; H01M 8/04014;
           H01M 8/04022; H01M 8/04268; H01M
           8/04373; H01M 8/0618; H01M 8/04007;
                   H01M 8/04753; Y02E 60/50
   See application file for complete search history.

(56)                 References Cited

U.S. PATENT DOCUMENTS

| | | | |
|---|---|---|---|
| 2005/0191534 A1* | 9/2005 | Kim ........................ | C01B 3/384 |
| | | | 429/513 |
| 2019/0252713 A1* | 8/2019 | Satake ................ | H01M 8/2457 |
| 2020/0381754 A1* | 12/2020 | Kagami ............ | H01M 8/04544 |
| 2021/0005907 A1* | 1/2021 | Kanao ................ | H01M 8/0618 |

FOREIGN PATENT DOCUMENTS

| | | |
|---|---|---|
| JP | 2004-309031 | 11/2004 |
| JP | 2012-28269 | 2/2012 |
| JP | 2020-042901 | 3/2020 |
| KR | 10-2012-0082582 | 7/2012 |

OTHER PUBLICATIONS

Japanese Office Action dated Nov. 14, 2023 issued in Japanese
Patent appl. No. 2022-177953.

* cited by examiner

FUEL CELL SYSTEM

CROSS-REFERENCE TO RELATED APPLICATION

This application claims priority under 35 U.S.C. § 119 to Korean Application No. 10-2021-0152589, filed Nov. 8, 2021, whose entire subject matter of which is hereby incorporated by reference.

BACKGROUND

1 Field

The present disclosure relates to a fuel cell system, and more particularly, to a fuel cell system using a liquid fuel.

2. Background

A fuel cell system is a power generation system that generates electrical energy by electrochemically reacting hydrogen (included in hydrocarbon-based substances such as methanol, ethanol, natural gas, etc.) with oxygen.

A fuel cell can adjust an amount of power generation by adjusting a flow rate of air supplied to a stack and an amount of gas reformed through a reformer. The gas that is supplied to a reformer may produce hydrogen by supplying and reforming a gas fuel.

The flow rate of the air that is supplied to the stack can be adjusted by a blower. However, the flow rate of air, which is adjusted by the blower, may be slightly limited, so there may be a problem in that when a power generation amount operation condition is excessive, a stable supply of air may be difficult, and the power generation efficiency may deteriorate.

When a burner is for heating a reformer, a density of reforming gas, and/or the like may be improved, and reaction efficiency of the reformer may be improved.

A fuel cell system using a liquid fuel is disclosed in Korean Patent No. 10-2116876, the subject matter of which is incorporated herein by reference. However, this document proposes a structure that directly supplies a liquid fuel to a fuel treatment apparatus that reforms a liquid fuel, such that heat supply (generated by a phase change of the liquid fuel) is not used.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
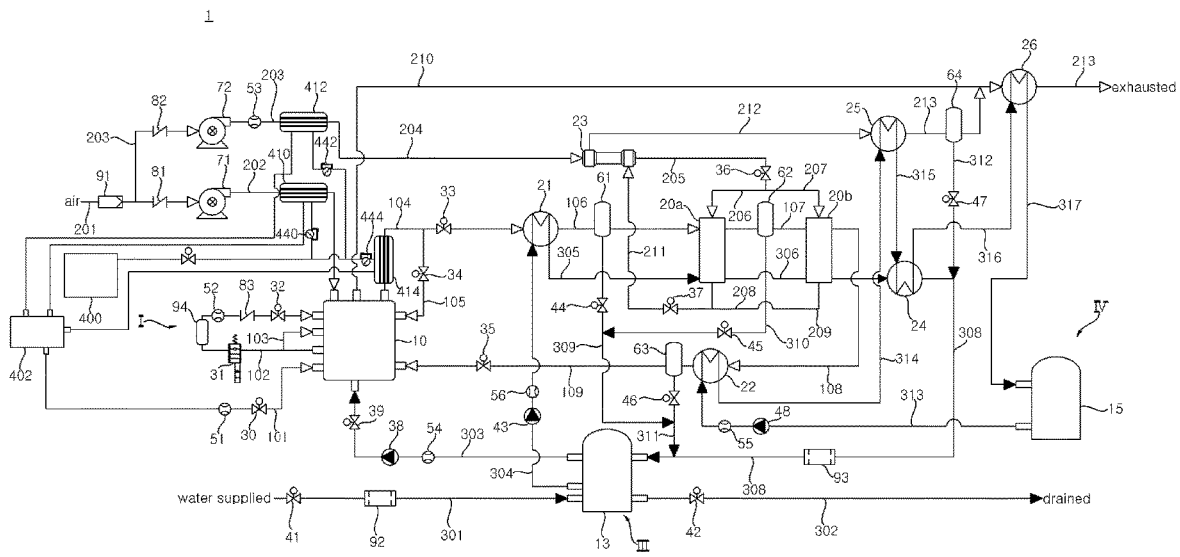
FIG. 1 is a diagram showing a configuration of a fuel cell system according to an embodiment of the present disclosure.

The entire configuration of a fuel cell system 1 according to a first embodiment of the present disclosure is described with reference to FIGS. 1 to 2. The fuel cell system 1 may include a fuel processing unit I, a power generation unit II, a cooling water circulation unit III, and/or a heat collection unit IV. The fuel processing unit I may include a fuel processor 10, a fuel valve 30 that adjusts a flow of fuel gas that is supplied to the fuel processor 10, and a first blower 71 that blows air to the fuel processor 10, etc.

Figure 2:
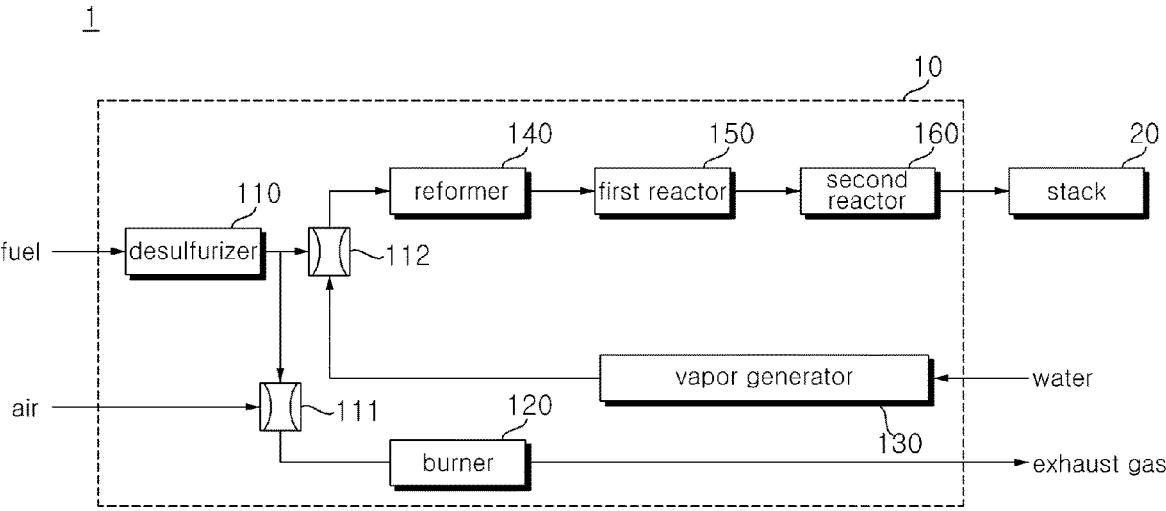
FIG. 2 is a view illustrating a fuel treatment apparatus according to an embodiment of the present disclosure.

Referring to FIG. 2, the fuel processor 10 may include a desulfurizer 110, a burner 120, a vapor generator 130, a reformer 140, a first reactor 150 and/or a second reactor 160. The fuel processor 10 may include at least one mixer. For example, the at least one mixer may include a first mixer 111 and/or a second mixer 112. The above components of the fuel processor 10 are structural components.

The desulfurizer 110 can perform a desulfurizing process of removing a sulfur compound included in a fuel gas. For example, the desulfurizer 110 may have an adsorbent therein. A sulfur compound (included in the fuel gas passing through the desulfurizer 110) can be adsorbed to the adsorbent. The adsorbent may be a metal oxide, Zeolite, activated carbon, etc. The desulfurizer 110 may include a filter that removes foreign substances included in a fuel gas.

The burner 120 can supply heat to the reformer 140 to promote a reforming reaction in the reformer 140. For example, a fuel gas discharged from the desulfurizer 110 and air flowing inside from the outside (of the fuel cell system) may be mixed in the first mixer 111 and then supplied to the burner 120. The burner 120 can generate a combustion heat by burning the gas mixture of fuel gas and air. The internal temperature of the reformer 140 can be maintained at an appropriate temperature (e.g., 800° C.) by heat supplied from the burner 120.

Exhaust gas produced by combustion of the gas mixture in the burner 120 can be discharged out of the fuel processor 10.

The vapor generator 130 can discharge vapor by evaporating water. For example, the vapor generator 130 can evaporate water by absorbing heat from the exhaust gas produced by the burner 120 and from the first reactor 150 and/or the second reactor 160.

The vapor generator 130 may be disposed adjacent to a pipeline through which exhaust gas discharged from the first reactor 150, the second reactor 160, and/or the burner 120 flows.

The reformer 140 can perform a reforming process of producing hydrogen gas from fuel gas with a sulfur compound removed, by using a catalyst. For example, a fuel gas discharged from the desulfurizer 110 and vapor discharged from the vapor generator 130 may be mixed in the second mixer 112 and then supplied to the reformer 140. The fuel gas and the vapor supplied to the reformer 140 may perform a reforming reaction in the reformer 140, such that hydrogen gas may be produced.

The first reactor 150 can reduce carbon monoxide produced by a reforming reaction of the components included in the gas discharged from the reformer 140. For example, carbon monoxide included in the gas discharged from the reformer 140 reacts with vapor in the first reactor 150, such that carbon dioxide and hydrogen can be produced. The internal temperature of the first reactor 150 may be a temperature (e.g., 200° C.) that is lower than the internal temperature of the reformer 140 and higher than the room temperature. The first reactor 150 may be referred to as a shift reactor. The second reactor 160 can reduce remaining carbon monoxide of the components included in the gas discharged from the first reactor 150. For example, preferential oxidation (PROX) may occur in which carbon monoxide included in the gas discharged from the first reactor 150 reacts with oxygen in the second reactor 160.

Preferential oxidation may require a large amount of oxygen, air should be additionally supplied, but there may be a defect that the density of hydrogen that is supplied to a stack decreases because the hydrogen is made weaker by the additionally supplied air. Accordingly, in order to overcome this defect, selective methanation may be used such that carbon monoxide and hydrogen react.

The gas that is discharged from the fuel processor 10 (through the reformer 130, the first reactor 150 and/or the second reactor 160) may be referred to as reforming gas.

Stacks 20a and 20b may generate electrical energy by applying electrochemical reaction to the reforming gas supplied from the fuel processor 10.

The stacks 20a and 20b may be configured by stacking unit cells in which an electrochemical reaction occurs.

The unit cell may be composed of a membrane electrode assembly (MEA) in which an anode and a cathode are disposed with an electrolyte membrane therebetween, a separator, etc. Electricity may be generated by decomposition of hydrogen into hydrogen ions and electrons by a catalyst at the anode of a membrane electrode assembly, and water may be produced by combination of hydrogen ions and electrons at the cathode of a membrane electrode assembly.

The stacks 20a and 20b may include a stack heat exchanger that dissipates heat generated by an electrochemical reaction process. The stack heat exchanger may be a heat exchanger that uses water as a refrigerant. For example, cooling water that is supplied to a stack heat exchanger can absorb heat generated in an electrochemical reaction process, and the cooling water may be increased in temperature by the absorbed heat may be discharged out of the stack heat exchanger.

The fuel processing unit I may include a first storage tank 400 that stores a liquid fuel, a second storage tank 402 that supplies a gasified fuel to the reformer 140 of the fuel processor 10, and fuel evaporators 410, 412, and 414 in which a liquid fuel discharged from the first storage tank 400 exchanges with external air to become a gas fuel. The fuel evaporators 410, 412, and 414 may include a first fuel evaporator 410 disposed in (or at) a first supply pipe, a second fuel evaporator 412 disposed in (or at) a second supply pipe, and a third fuel evaporator 414 disposed in (or at) a reforming gas discharge pipe 104a. The configuration and connection relationships of the first storage tank 400, the second storage tank 402, and the fuel evaporators 410, 412, and 414 may be described in detail below. In this disclosure, connections may be described between structural components. For example, the disclosure may reference a pipe which may be considered a channel, a duct, a connector, a path, a flow path and/or etc.

The fuel valve 30 may be disposed in a fuel supply pipe forming a fuel supply channel 101 through which fuel gas to be supplied to the fuel processor 10 flows. The flow rate of fuel gas to be supplied to the fuel processor 10 may be adjusted in correspondence to a degree of opening of the fuel valve 30. For example, the fuel valve 30 can block the fuel supply channel 101 to stop supply of fuel gas to the fuel processor 10.

A first fuel flow meter 51 may be disposed at (or in) the fuel supply pipe. The first fuel flow meter may detect the flow rate of fuel gas flowing in the fuel supply channel 101.

The fuel processing unit I may include a first supply pipe forming a first supply channel 202 therein to supply external air to the fuel processor 10, and the first blower 71 disposed in the first supply pipe for supplying external air to the fuel processor 10.

The first blower 71 can blow air flowing from the outside to the fuel processor 10 through the first supply channel 202. The first blower 71 can blow air flowing inside from the outside (of the fuel cell system) through an external air inflow channel 201 to the fuel processor 10.

The air flowing through the first supply channel 202 and into the fuel processor can be supplied to the burner 120 (of the fuel processor 10). For example, the air flowing into the fuel processor 10 can be mixed with fuel gas, which is discharged from the desulfurizer 110, in the first mixer 111 and then supplied to the burner 120.

A first air filter 91 may be disposed in (or at) an external air inflow pipe forming the external air inflow channel 201. The first air filter 91 may remove (or reduce) foreign substances such as dirt included in air. A first air-side check valve 81 may limit the flow direction of air.

The fuel processing unit I may include a first internal gas pipe forming a first internal gas channel 101 through which the fuel gas discharged from the desulfurizer 110 flows to the reformer 140. The fuel processing unit I may also include a proportional control valve 31, an internal fuel valve 32 that adjusts flow of fuel gas flowing into the reformer 140, a second fuel flow meter 52 that detects the flow rate of fuel gas flowing through the internal gas channel 102, a fuel-side check valve that limits the flow direction of fuel gas flowing through the internal gas channel 102, and/or a sulfur detector 94.

The proportional control valve 31 can adjust the flow rate, pressure, etc. of the fuel gas discharged from the desulfurizer 110 and flowing to the reformer 140 through internal/external feedback in an electrical control type.

The sulfur detector 94 can detect sulfur included in the fuel gas discharged from the desulfurizer 110. The sulfur detector 94 may include an indicator that changes in color by reacting with a sulfur compound that is not removed by the absorbent of the desulfurizer 110. The indicator may include phenolphthalein, a molybdenum compound, etc.

The fuel processing unit I may include a second internal gas pipe forming a second internal gas channel 103 that sends the fuel gas discharged from the desulfurizer 110 to the burner 120. The burner 120 can use the fuel gas flowing inside through the second internal gas channel 103 for combustion.

The first internal gas channel 102 and the second internal gas channel 103 may communicate with each other.

The fuel processor 10 may be connected with a water supply pipe forming a water supply channel 303 in which water discharged from a water supply tank 13 may flow. a water pump 38 may generate flow of water flowing through the water supply channel 303, a water supply valve 39 may adjust flow of water, and a water flow meter 54 may detect the flow rate of the water flowing through the water supply channel 303.

The exhaust gas produced by the burner 120 (of the fuel processor 10) may be discharged from the fuel processor 10 through an exhaust gas discharge channel 210.

The fuel processor 10 may be connected to a reforming gas discharge pipe forming a reforming gas discharge channel 104. The reforming gas discharged from the fuel processor 10 can flow through the reforming gas discharge channel 104.

The reforming gas discharge pipe may be connected to a reforming gas heat exchanger 21 which performs a heat exchange of reforming gas. A reforming gas valve 33 may adjust flow of the reforming gas flowing in the reforming gas discharge pipe to the reforming gas heat exchanger 21.

The reforming gas discharge pipe may be connected with a bypass pipe forming a bypass channel 105 such that reforming gas discharged from the fuel processor 10 may flow back to the fuel processor 10. The bypass pipe may be connected to the fuel processor 10. The reforming gas flowing from the fuel processor 10 can be supplied to the burner 120 through the bypass channel 105. The reforming gas supplied to the burner 120 through the bypass channel 105 may be used as a fuel for combustion in the burner 120. A bypass valve 34 that adjusts flow of reforming gas flowing inside from the fuel processor 10 may be disposed in (or at) the bypass pipe.

The power generation unit II includes stacks 20a and 20b, a reforming gas heat exchanger 21 for performing heat exchange based on the reforming gas discharged from the fuel processor 10, an AOG heat exchanger 22 for performing heat exchange of the gas discharged from the stacks 20a and 20b (without reacting), and a humidifier 23 that supplies moisture to water (or liquid) that is to be supplied to the stacks 20a and 20b.

A second blower 72 may be provided to provide (or blow) air to the stacks 20a and 20b. The gas discharged (without reacting) from the stacks 20a and 20b may be referred to as anode off gas (AOG). In an example embodiment, the fuel cell system 1 may include two stacks 20a and 20b, but the present disclosure is not limited thereto.

The reforming gas heat exchanger 21 may be connected to a reforming gas discharge pipe forming a reforming gas discharge channel 104 so that reforming gas discharged from the fuel processor 10 may flow. The reforming gas heat exchanger 21 may be connected to a cooling water supply pipe for forming a cooling water supply channel 304 in which water discharged from the water supply tank 13 may flow. The reforming gas heat exchanger 21 enables reforming gas flowing through the reforming gas discharge channel 104 to exchange heat with water flowing through the cooling water supply channel 304.

A cooling water pump 43 and a cooling water flow meter 56 may be provided at the cooling water supply pipe. The cooling water pump 43 may send water stored in the water supply tank 13 to the reforming gas heat exchanger 21. The cooling water flow meter 56 may detect the flow rate of water flowing through the cooling water supply channel 304.

The reforming gas heat exchanger 21 may be connected to a stack gas supply pipe forming a stack gas supply channel 106. Reforming gas discharged from the reforming gas heat exchanger 21 can flow to the stacks 20a and 20b through the stack gas supply channel 106.

A reforming gas dehumidifier 61 may be disposed in (or at) the stack gas supply pipe to adjust the amount of moisture included in the reforming gas. Reforming gas flowing in the reforming gas dehumidifier 61 can be discharged from the reforming gas dehumidifier 61 after moisture is removed.

Condensate water produced in the reforming gas dehumidifier 61 can be discharged from the reforming gas dehumidifier 61 and can then flow to a first water collection channel 309. A first water collection valve 44 that adjusts flow of water flowing through the first water collection channel 309 may be disposed in (or at) a first water collection pipe that forms the first water collection channel 309.

The stacks 20a and 20b can generate electrical energy by electrochemical reaction to the reforming gas flowing through the stack gas supply channel 306. In an example embodiment, when the fuel cell system 1 includes a plurality of stacks 20a and 20b, reforming gas discharged (without reacting) from the first stack 20a can additionally generate an electrochemical reaction in the second stack 20b.

The second blower 72 may be disposed between a second supply pipe that forms a second supply channel 203 and a stack-side air inflow pipe that forms a stack-side air inflow channel 204. The second supply pipe may be disposed at a downstream side of a first air filter 91. The second blower 72 can blow air flowing through the second supply channel 203, through the stack-side air inflow channel 204 and to the stacks 20a and 20b.

A second air-side check valve 82 that limits the flow direction of air flowing through the second supply channel 203 may be disposed in (or at) the second supply pipe.

An air flow meter 53 that detects the flow rate of air flowing through the stack-side air inflow channel 204 may be disposed in (or at) the stack-side air inflow pipe.

The humidifier 23 may supply moisture to air flowing through the stack-side air inflow channel 204, and the humidifier 23 may discharge air including moisture to a stack-side air supply channel 205.

A stack-side air supply valve 36 may be disposed in (or at) a stack-side air supply pipe that forms the stack-side air supply channel 205. The stack-side air supply valve 36 may adjust flow of air to be supplied to the stacks 20a, 20b.

The stack-side air supply pipe may be connected with individual supply pipes that form individual supply channels 206 and 207 corresponding to the stacks 20a and 20b, respectively. Air flowing through the stack-side air supply channel 205 can be supplied to the stacks 20a and 20b through the individual supply channels 206 and 207.

The plurality of stacks 20a and 20b may be connected to each other through a gas connection pipe that forms a gas connection channel 107. The reforming gas discharged (without reacting) from the first stack 20a can flow into the second stack 20b through the gas connection channel 107.

An additional dehumidifier 62 may be disposed in (or at) the gas connection pipe to remove (or reduce) water produced by condensation that is generated while the reforming gas flowing through the gas connection channel 107 flows through the first stack 20a.

The water produced in the additional dehumidifier 62 can be discharged from the additional dehumidifier 62 and can flow to the second water collection channel 310. A second water collection valve 45 that adjusts flow of water may be disposed in (or at) a second water collection pipe that forms the second water collection channel 310. The second water collection pipe may be connected with the first water collection pipe.

Anode off gas (AOG) discharged (without reacting) in the stacks 20a and 20b can flow through the stack gas discharge channel 108.

The AOG heat exchanger 22 may be connected to a stack gas discharge pipe that forms a stack gas discharge channel 108 to allow flowing of AOG gas discharged from the stacks 20a and 20b.

The AOG heat exchanger 22 may be connected to a hot water supply pipe that forms a hot water supply channel 313 such that water discharged from the heat collection tank 15 may flow to the AOG heat exchanger 22. The AOG heat exchanger may enable AOG flowing in the stack gas discharge channel 108 to exchange heat with water flowing in the hot water supply channel 313.

A hot water pump 48 may send water from the heat collection tank 15 to the AOG heat exchanger 22, and a hot water flow meter 55 may detect the flow rate of water flowing through the hot water supply channel 313. The hot water pump 48 and the hot water flow meter 55 may be disposed in (or at) the hot water supply pipe.

The AOG heat exchanger 22 may be connected to an AOG supply pipe that forms an AOG supply channel 109. The AOG heat exchanger 22 can discharge AOG exchange heat through the AOG supply channel 109. The AOG discharged from the AOG heat exchanger 22 can flow to the fuel processor 10 through the AOG supply channel 109. The AOG supplied to the fuel processor 10 through the AOG supply channel 109 can be used as a fuel for combustion in the burner 120.

An AOG dehumidifier 63 may adjust the amount of moisture included in AOG, and an AOG valve 35 may adjust flow of the AOG that is supplied to the fuel processor 10. The AOG dehumidifier 63 and the ACG valve 35 may be disposed in (or at) the AOG supply pipe. AOG flowing in the AOG dehumidifier 63 can be discharged from the AOG dehumidifier 63 after moisture is removed.

Condensate water produced in the AOG dehumidifier 63 can be discharged from the AOG dehumidifier 63 and can then flow to a third water collection channel 311. A third water collection valve 46 that adjusts flow of water flowing through the third water collection channel 311 may be disposed in a third water collection pipe that forms the third water collection channel 311. The third water collection pipe may be connected with the first water collection pipe.

A stack-side air discharge pipe that forms the stack-side air discharge channel 211 may be connected to individual discharge pipes that form individual discharge channels 208 and 209 corresponding to the stacks 20a and 20b, respectively. A stack-side air discharge valve 37 may be disposed in (or at) the stack-side air discharge pipe to adjust flow of air flowing through the air discharge channel 211.

The air discharged from the stacks 20a and 20b can flow to the stack-side air discharge channel 211 through the individual discharge channels 208 and 209. The air flowing through the stack-side air discharge channel 211 may include moisture produced by an electrochemical reaction that occurs in the stacks 20a and 20b.

The stack-side air discharge pipe may be connected to the humidifier 23. The humidifier 23 can supply moisture to the air flowing to the stacks 20a and 20b using the moisture included in the air supplied from the stack-side air discharge channel 211. The air supplied to the humidifier 23 through the stack-side air discharge channel 211 can be discharged to a humidifier discharge channel 212 through the humidifier 23.

The cooling water circulation unit III may include a water supply tank 13 that stores water (provided in the fuel cell system 1), a water pump 38 that sends water to the fuel processor 10, a water supply valve 39 that adjusts flow of water that is to be supplied to the fuel processor 10, a cooling water pump 44 that sends water to the reforming gas heat exchanger 21, etc.

The heat collection unit IV may include a heat collection tank 15 that stores water to be used for heat exchange, and a heat collection pump 38 that sends the water stored in the heat collection tank 15 to outside of the heat collection tank 15.

The water supply tank 13 may be connected to a water inflow pipe that forms a water inflow channel 301. The water supply tank 13 can store water that is provided through the water inflow channel 301. The water inflow pipe may be disposed with a first liquid filter 92 that removes foreign substances included in water supplied from the outside, and a water inflow valve 41 that adjusts flow of water flowing into the water supply tank 13.

The water supply tank 13 may be connected to a water discharge pipe that forms a water discharge channel 302. The water supply tank 13 can discharge at least a portion of the water stored in the water supply tank 13 to the outside of the fuel cell system through the water discharge channel 302. A water discharge valve 42 may be disposed in (or at) the water discharge pipe to adjust flow of water that is discharged from the water supply tank 13.

The water supply tank 13 may be connected to a water storage pipe that forms a water storage channel 308. The water supply tank 13 can store water that flows through the water storage channel 308. For example, the water discharged from the reforming gas dehumidifier 61, the additional dehumidifier 62, the AOG dehumidifier 63, and/or the air dehumidifier 64 and flowing through the water collection channel 311 can flow into the water supply tank 13 through the water storage channel 308. A second liquid filter 93 that removes foreign substances (included in the water that is collected to the water supply tank 13) may be disposed in (or at) the water supply pipe.

At least a portion of the water stored in the water supply tank 13 can flow to the reforming gas heat exchanger 21 based on the cooling water pump 43 and can exchange heat with reforming gas at the reforming gas heat exchanger 21. The water discharged from the reforming gas heat exchanger 21 can flow through the stack water supply channel 305 and into the stacks 20a and 20b.

The water flowing through the stack water supply channel 305 and into the stacks 20a and 20b can cool the stacks 20a and 20b. The water flowing in the stacks 20a and 20b can flow through stack heat exchangers included in the stacks 20a and 20b, and can absorb heat generated by an electrochemical reaction occurring in the stacks 20a and 20b.

The plurality of stacks 20a and 20b may be connected by a water connection pipe that forms a water connection channel 306. The water discharged from the first stack 20*a* can flow through the water connection channel 306 and into the second stack 20*b*.

The water discharged from the stacks 20*a* and 20*b* can flow into the cooling water heat exchanger 24 through a stack water discharge channel 307. The cooling water heat exchanger 24 enables the water discharged from the stacks 20*a* and 20*b* and the water discharged from the heat collection tank 15 to exchange heat. The water discharged from the stacks 20*a* and 20*b* can flow through the cooling water heat exchanger 24 and into the water storage channel 308.

The water discharged from the heat collection tank 15 by the hot water pump 48 can flow into the AOG heat exchanger 22 through the hot water supply channel 313. The water exchanging heat with AOG in the AOG heat exchanger 22 can be discharged to a first hot water circulation channel 314.

The air heat exchanger 25 may be connected to a humidifier discharge pipe that forms a humidifier discharge channel 212 so that air discharged from the humidifier 23 may flow to the air heat exchanger 25. The air heat exchanger 25 may be connected to the first hot water circulation channel 314 to which the water discharged from the AOG heat exchanger 22 may flow. The air heat exchanger 25 may enable the water flowing through the humidifier discharge channel 212 to exchange heat with the water flowing through the first hot water circulation circuit 314.

The air having finished heat exchange in the air heat exchanger 25 can be discharged from the air heat exchanger 25 through the air discharge channel 213. The air discharge pipe that forms the air discharge channel 213 may be connected with an exhaust gas discharge pipe forming the exhaust gas discharge channel 210. Exhaust gas flowing through the exhaust gas discharge channel 210 may be mixed with air flowing through the air discharge channel 213.

The air dehumidifier 64 may be disposed in (or at) the air discharge pipe. The air dehumidifier 64 may adjust the amount of moisture included in air that is to be discharged to the outside. Air flowing through the air dehumidifier 64 can be discharged from the air dehumidifier 64 after moisture is removed.

Condensate water produced in the air dehumidifier 64 can be discharged from the air dehumidifier 64 and can then flow to a fourth water collection channel 312. A fourth water collection valve 47 that adjusts flow of water may be disposed in (or at) a fourth water collection pipe that forms the fourth water collection channel 312. The fourth water collection pipe may be connected to the water storage pipe.

The air having finished heat exchange in the air heat exchanger 25 can be discharged from the air heat exchanger 25 through a second hot water circulation channel 315. The water discharged from the air heat exchanger 25 can flow into the cooling water heat exchanger 24 through the second hot water circulation channel 315.

The cooling water heat exchanger 24 enables the water flowing through the stack water discharge channel 307 to exchange heat with the water flowing through the second hot water circulation channel 315.

The exhaust heat exchanger 26 may be connected to an exhaust gas discharge pipe that forms the exhaust gas discharge channel 210 in which exhaust gas flows. The exhaust heat exchanger 26 may be connected to a third hot water circulation pipe that forms a third hot water circulation channel 316 so that water discharged from the cooling water heat exchanger 24 may flow to the exhaust heat exchanger 26. The exhaust heat exchanger 26 enables the water flowing through the exhaust gas discharge channel 210 to exchange heat with the water flowing through the third hot water circulation channel 316.

The exhaust gas having finished heat exchange in (or at) the exhaust heat exchanger 26 can be discharged to the exhaust channel 213 and the exhaust gas flowing through the exhaust channel 213 can be discharged to the outside.

The water having finished heat exchange in (or at) the exhaust heat exchanger 26 can be discharged to the hot water collection channel 317, and the water flowing through the hot water circulation channel 317 can flow into the heat collection tank 15.

Figure 3:
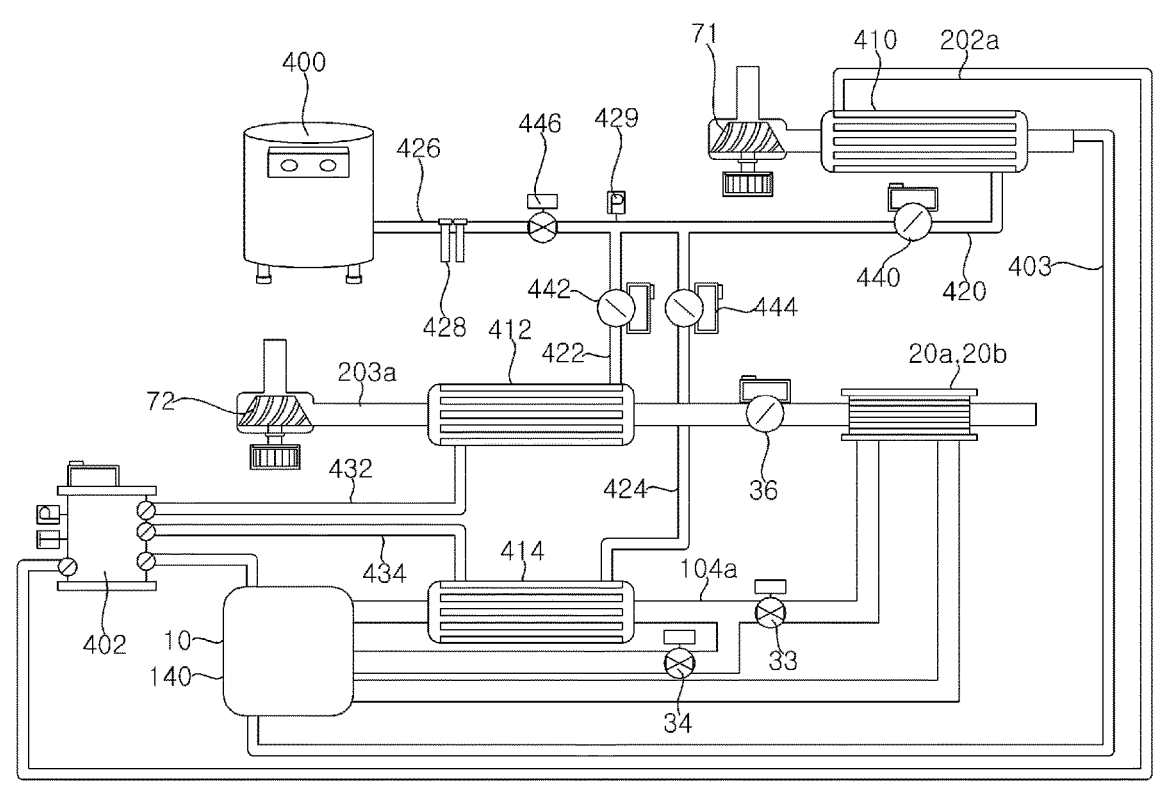
FIG. 3 is a view schematically showing a configuration for describing flow and heat exchange of a liquid fuel and a gas fuel in the fuel cell system according to an embodiment of the present disclosure.

A configuration related to flow of liquid gas and gaseous gas flowing to the reformer 140 may be described with reference to FIGS. 3 and 4.

The fuel cell system 1 may include the first storage tank 400 that stores liquid gas (or liquid fuel), the second storage tank 402 that supplies a gasified fuel to the reformer 140, and fuel evaporators 410, 412, and 414 in which a liquid fuel discharged from the first storage tank 400 exchanges with external air so as to be evaporated.

The fuel evaporators 410, 412, and 414 include a first fuel evaporator 410 disposed in (or at) a first supply pipe, a second fuel evaporator 412 disposed in (or at) a second supply pipe, and a third fuel evaporator 414 disposed in (or at) a reforming gas discharge pipe 104*a*.

The fuel cell system 1 may include a first liquid gas supply pipe 420 connecting the first storage tank 400 and the first fuel evaporator 410, a second liquid gas supply pipe 422 connecting the first storage tank 400 and the second fuel evaporator 412, and a third liquid gas supply pipe 424 connecting the first storage tank 400 and the third fuel evaporator 414.

The fuel cell system 1 may include a first gaseous gas supply pipe 430 connecting the first storage tank 400 and the second storage tank 402, a second gaseous gas supply pipe 432 connecting the second fuel evaporator 412 and the second storage tank 402, and a third gaseous gas supply pipe 434 connecting the third fuel evaporator 414 and the second storage tank 402.

The fuel cell system 1 may include a plurality of expansion valves 440, 442, and 444 configured to provide a liquid fuel to at least one of the first fuel evaporator 410, the second fuel evaporator 412, and the third fuel evaporator 414. The fuel cell system 1 may include the first expansion valve 440 disposed in (or at) the first liquid gas supply pipe and opening/closing an internal channel of the first liquid gas supply pipe or adjusting the amount of opening of the internal channel. The fuel cell system may include the second expansion valve 442 disposed in (or at) the second liquid gas supply pipe 422 and opening/closing an internal channel of the second liquid gas supply pipe 422 or adjusting the amount of opening of the internal channel. The fuel cell system may include the third expansion valve 444 disposed in (or at) the third liquid gas supply pipe 424 and opening/closing an internal channel of the third liquid gas supply pipe 424 or adjusting the amount of opening of the internal channel.

The fuel cell system 1 may include a liquid gas common pipe 426 connecting the fuel processor 10 with the first liquid gas supply pipe 420, the second liquid gas supply pipe 422, or the third liquid gas supply pipe 424, and a common pipe valve 446 for opening/closing the liquid gas common pipe 426.

The first storage tank 400 may store a liquid fuel. The first storage tank 400 may be a pressure tank type to store a fuel in a liquid state. The first storage tank 400 may be composed of a dual-structure tank and an insulator.

Figure 4:
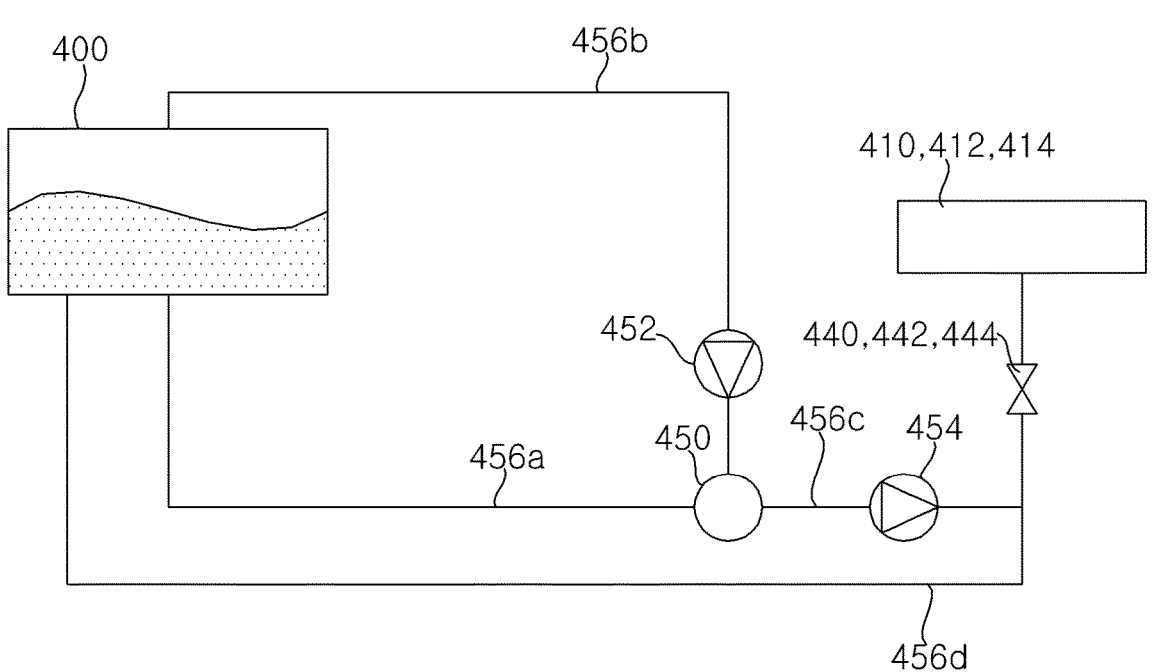
FIG. 4 is a schematic view illustrating a first storage tank and relevant components according to an embodiment of the present disclosure.

FIG. 4 shows a re-liquefier 450 that re-liquefies a fuel discharged from the first storage tank 400 and a pump 454, disposed between the first storage tank 400 and the fuel evaporators 410, 412, and 414, that supplies a fuel discharged from the re-liquefier 450 to the fuel evaporators 410, 412, and 414. Expansion valves 440, 442, and 444 that expand a liquid fuel flowing to the fuel evaporators 410, 412, and 414 may be disposed between the first storage tank 400 and the fuel evaporators 410, 412, and 414.

The re-liquefier 450 can re-liquefy a refrigerant flowing to a separate heat pump and a gas fuel discharged and evaporated from the first storage tank 400. The re-liquefier 450 can re-liquefy a gas fuel through evaporation of a refrigerant.

The first storage tank 400 and the re-liquefier 450 may be connected to a first pipe 456a through which a liquid-state fuel flows from the first storage tank 400, and a second pipe 456b through which a gas-state fuel flows from the first storage tank 400. The first pipe 456a is connected to a lower portion of the first storage tank 400, so the liquefied gas stored in the first storage tank 400 can flow.

The second pipe 456b is connected to an upper portion of the first storage tank 400, so the gaseous gas stored in the first storage tank 400 can flow. A compressor 452 may be disposed in (or at) the second pipe 456b to compress the gaseous gas discharged from the first storage tank 400.

The re-liquefier 450 can mix the liquid fuel flowing through the first pipe 456a and the gas fuel flowing through the second pipe 456b, and can cool and discharge the mixture as a liquid fuel. The pump 454 may be disposed such that the liquid fuel passing through the re-liquefier 450 may be provided to the fuel evaporators 410, 412, and 414.

A third pipe 456c is disposed between the re-liquefier 450 and the fuel evaporators 410, 412, and 414, so the liquid fuel discharged from the re-liquefier 450 can be supplied to the fuel evaporators 410, 412, and 414. The pump 454 may be disposed in (or at) the third pipe 456c. The expansion valves 440, 442, and 444 that expand a liquid fuel flowing to the fuel evaporators 410, 412, and 414 may be disposed in (or at) the third pipe 456c. A fourth pipe 456d may diverge from the third pipe 456c and can supply a liquid fuel in the pipe to the first storage tank.

The first storage tank 400 can temporarily store a gas fuel flowing from the fuel evaporators 410, 412, and 414. The gas fuel stored in the first storage tank 400 can be supplied to the reformer 140 through the fuel supply channel 101.

The liquid gas common pipe 426 may be connected to the first liquid gas supply pipe 420, the second liquid gas supply pipe 422, and the third liquid gas supply pipe 424. A filter 428 for preventing inflow of foreign substances, a common pipe valve 446 that adjusts flow of the liquid gas discharged from the first storage tank 400 and blocks high-pressure gas when the system is not used and in an emergency, and a pressure sensor 429 that senses the pressure of liquid gas may be disposed in the liquid gas common pipe 426.

<Operation Mode>

The operation of the fuel cell system 1 may be described with reference to FIGS. 5 to 7.

The fuel cell system 1 can operate in a preheating mode WM that preheats the system, a reforming mode RM that secures the production amount of reforming gas, and a power generation mode PM that generates electricity through the stacks 20a and 20b.

In the preheating mode WM, the first blower 71 is operated such that external air can be supplied to the reformer 140. In the preheating mode WM, the fuel processor 10 may be preheated by generating combustion heat by burning a gas mixture of fuel gas and air through the burner 120 (of the fuel processor 10).

Figure 5:
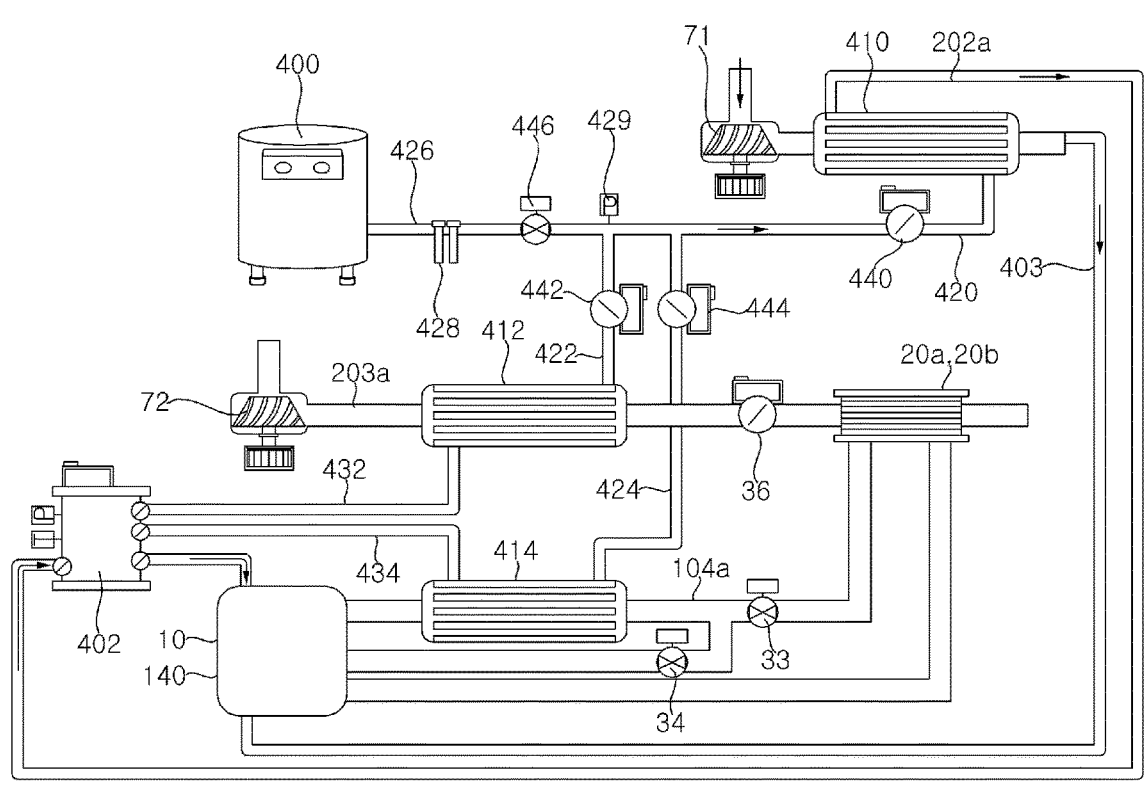
FIG. 5 is a view illustrating flow of a fuel and gas in a preheating mode in FIG. 3.

Referring to FIG. 5, in the preheating mode WM, the common pipe valve 446 is opened and the degree of opening of the first expansion valve 440 is increased, so a liquid fuel is supplied to the first fuel evaporator 410. A liquid fuel changes in phase into a gas fuel in the first fuel evaporator 410, and air flowing inside (from the outside) and flowing therein can be supplied with the temperature reduced to the burner 120. The gas fuel discharged from the first fuel evaporator 410 flows to the second storage tank 402.

When gas is produced up to a predetermined pressure in the second storage tank 402 through the operation, the gaseous gas of the second storage tank 402 may be supplied to the fuel processor 10. Reforming gas may be produced in the fuel processor 10 by reforming the gas fuel discharged from the second storage tank 402.

As the burner 120 is operated, both the temperature and pressure of air are increased at the outlet (in comparison to the inlet) of the first blower 71, so high-temperature/high-pressure air flows into the first fuel evaporator 410. The air flowing in the first fuel evaporator 410 may supply (or provide) heat for gasifying the liquid fuel discharged from the first storage tank 400. Thereafter, the air discharged from the first fuel evaporator 410 may be supplied to the burner 120 in a low-temperature and high-pressure state. The density of the low-temperature high-pressure air may be low, so more air can be supplied into the same volume of the fuel processor 10. More gas mixture can flow inside in combustion through mixing with gas in the fuel processor 10, so the combustion time to a target temperature can be reduced.

When low-temperature high-pressure air and low-temperature gas fuel is supplied to the burner of the fuel processor 10 through the first fuel evaporator 410, more gas mixture can be supplied to the burner. Since more gas mixture is supplied than disadvantageous arrangements, the preheating operation time may be reduced.

In the reforming mode RM, the amount of reformed hydrogen may be secured by supplying reforming gas produced through the reformer 140 back to the reformer 140. In the reforming mode RM, high-temperature reforming gas may be produced from a gas fuel in the reformer 140, and reforming gas produced through the bypass valve 34 may be fully used for combustion before the power generation mode PM.

Figure 6:
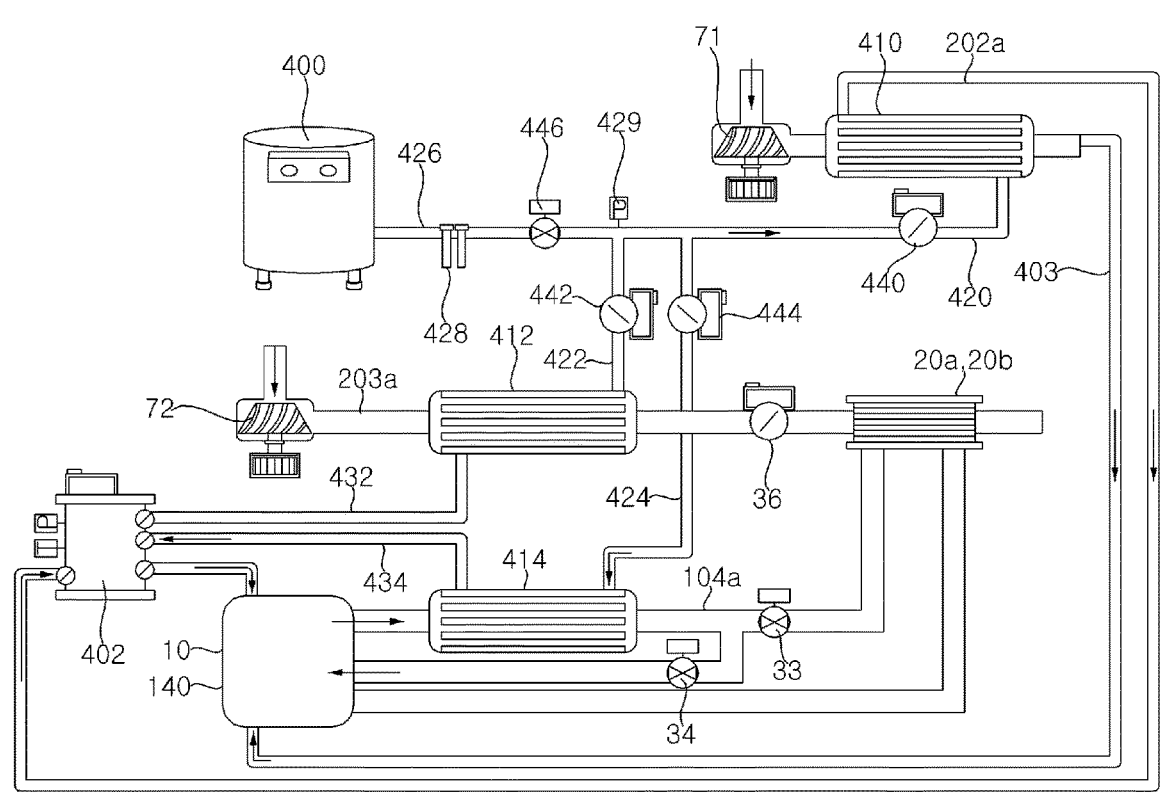
FIG. 6 is a view illustrating flow of a fuel and gas in a reforming mode in FIG. 3.

Referring to FIG. 6, in the reforming mode RM, the degree of opening of each of the first expansion valve 440 and the third expansion valve 444 may be secured. Accordingly, the liquid fuel discharged from the first storage tank 400 can flow to the first fuel evaporator 410 and the third fuel evaporator 414. In this example, the amount of the liquid fuel flowing to the third fuel evaporator 414 may be increased to more than the amount of the liquid fuel flowing to the first fuel evaporator 410 by increasing the degree of opening of the third expansion valve 444. In the reforming mode RM, a size of the internal channel of the third liquid gas supply pipe 424 opened by the third expansion valve 444 may be larger than a size of the internal channel of the first liquid gas supply pipe 420 opened by the first expansion valve 440. The temperature of the reforming gas flowing through the third fuel evaporator 414 may be higher than the temperature of the air flowing through the first fuel evaporator 410. A liquid fuel may change the phase in the third fuel evaporator 414 in comparison to the first fuel evaporator 410, so the amount of a fuel liquid flowing to the third fuel evaporator 414 may be increased.

In the operation in the reforming mode RM, the reformer 140 may produce reforming gas using the gaseous gas stored in the second storage tank 402. Since the temperature of the reforming gas discharged from the reformer 140 reaches about 90 degrees or higher, a liquid fuel may be supplied to the third fuel evaporator 414 to use the waste heat of the reforming gas discharged from the reformer 140.

The liquid gas supplied to the first fuel evaporator 410 and the third fuel evaporator 414 may be evaporated by exchanging heat with high-temperature reforming gas or the air flowing through the first supply pipe 202a and is then supplied to the second storage tank 402. When a gas fuel is produced through the first fuel evaporator 410 and the third fuel evaporator 414, gas can be produced more than when only the first fuel evaporator 410 is used. As described above, as the production amount of gas increases, the reformer reactor may produce reforming gas while consuming more gas and gets ready for entering the power generation mode operation.

High-temperature reforming gas discharged from the reformer 140 can be changed into low-temperature reforming gas by exchanging heat with a liquid fuel through the third fuel evaporator 414. The low-temperature reforming gas may be supplied to the burner 120 through the bypass valve 34 and used to improve combustion efficiency. The low-temperature reforming gas may also decrease in density due to a temperature change, so it can be supplied more to the burner 120. Reforming gas containing a large amount of hydrogen may also be burned in the burner 120, so combustion reaction and efficiency can be improved.

In the power generation mode PM, electricity can be generated through an electrochemical reaction of oxygen and hydrogen in the stacks 20a and 20b by the reforming gas discharged from the reformer 140 and the air flowing inside from the outside.

In the power generation mode PM, as the first blower 71 is operated, external air may flow to the fuel processor 10, and as the second blower 72 is operated, external air can be supplied to the stacks 20a and 20b.

As the reformer 140 is operated, reforming gas discharged from the reformer 140 can be supplied to the stacks 20a and 20b.

Figure 7:
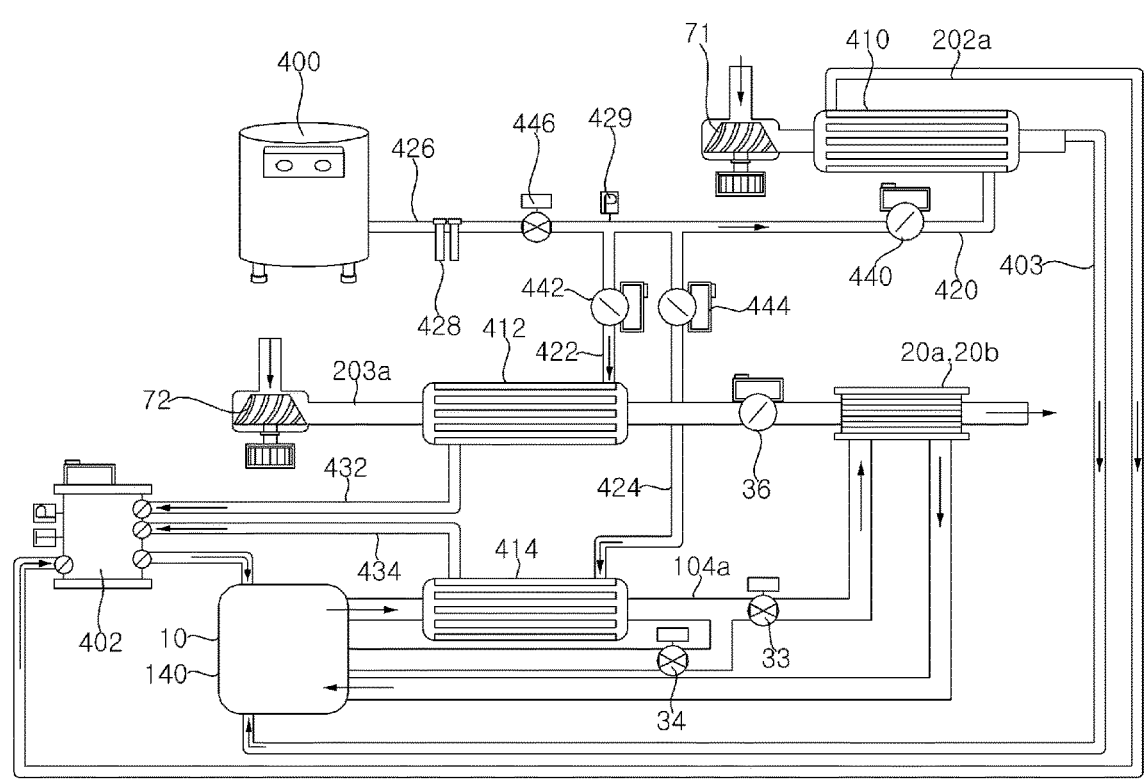
FIG. 7 is a view illustrating flow of a fuel and gas in a power generation mode in FIG. 3.

Referring to FIG. 7, when the system is operated in the power generation mode Pm, the liquid fuel discharged from the first storage tank 400 can be supplied to each of the first fuel evaporator 410, the second fuel evaporator 412, and the third fuel evaporator 414.

In the power generation mode PM, all of the first expansion valve 440, the second expansion valve 442, and the third expansion valve 444 may be opened. In the power generation mode, the degree of amount may be set such that the amount of the liquid fuel flowing through the third expansion valve 444 is larger than the amount of the liquid fuel flowing through the first expansion valve 440 or the second expansion valve 442. In the power generation mode, a size of the internal channel of the third liquid gas supply pipe 424 opened by the third expansion valve 444 may be larger than a size of the internal channel of the first liquid gas supply pipe 420 opened by the first expansion valve 440 or a size of the internal channel of the second liquid gas supply pipe 422 opened by the second expansion valve 442.

When the system is operated in the power generation mode PM, the second blower 72 may be operated, which increases both the temperature and pressure of the air discharged from the second blower 72 in comparison to the air flowing into the second blower 72, similar to the operation of the first blower 71.

The second fuel evaporator 412 disposed in (or at) the second supply pipe 203a may exchange heat with the liquid fuel discharged from the first storage tank 400, so low-temperature and high-pressure air is discharged from the first fuel evaporator 410. The low-temperature high-pressure air discharged from the second fuel evaporator 412 is supplied to the stacks 20a and 20b, reacts with reforming gas to generate power, and is then discharged.

The reforming gas produced in the reformer 140 may be supplied to the stacks 20a and 20b through the third fuel evaporator 414, and non-reacting hydrogen (AOG) discharged without being used for power generation of the stacks 20a and 20b may be supplied back to the burner 120 and used to improve combustion efficiency. The reforming gas that is supplied to the stacks 20a and 20b may decrease in temperature through the third fuel evaporator 414, so more reforming gas can be supplied into a predetermined volume, and accordingly reaction efficiency may be improved for power generation.

As described above, the temperature of the air and reforming gas that are supplied to the stacks 20a and 20b may decrease, so the density is greatly decreased in comparison to high temperature. Since the reaction area of air and reforming gas in the stacks 20a and 20b may be very limited, more reaction can be induced when density is low. This may decrease the density of the air and the reforming gas, so as to improve power generation efficiency of the stacks.

Various embodiments of the fuel evaporators 410, 412, and 414 (i.e., the first fuel evaporator 410, the second fuel evaporator 412, or the third fuel evaporator 414) may be described with reference to FIGS. 8a to 14b.

The fuel evaporators 410, 412, and 414 may include a housing that forms the external shape, and a fuel flow section through which a liquid fuel flows and a gas flow section through which air or reforming gas flows are formed in the housing.

Pluralities of fuel flow sections and gas flow sections may be alternately arranged. A protrusion that can increase a contact area of a liquid fuel or air may be formed in each of the pipe forming the fuel flow section and the pipe forming the gas flow section. The fuel flow section and the gas flow section may be formed in various types.

Figure 8A:
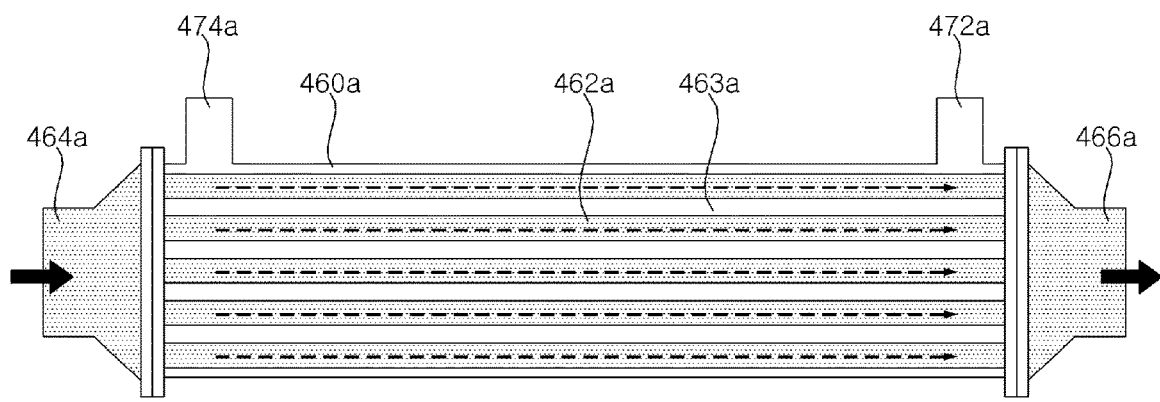
FIG. 8*a* is a schematic cross-sectional view illustrating a gas flow section of a fuel evaporator.
Figure 8B:
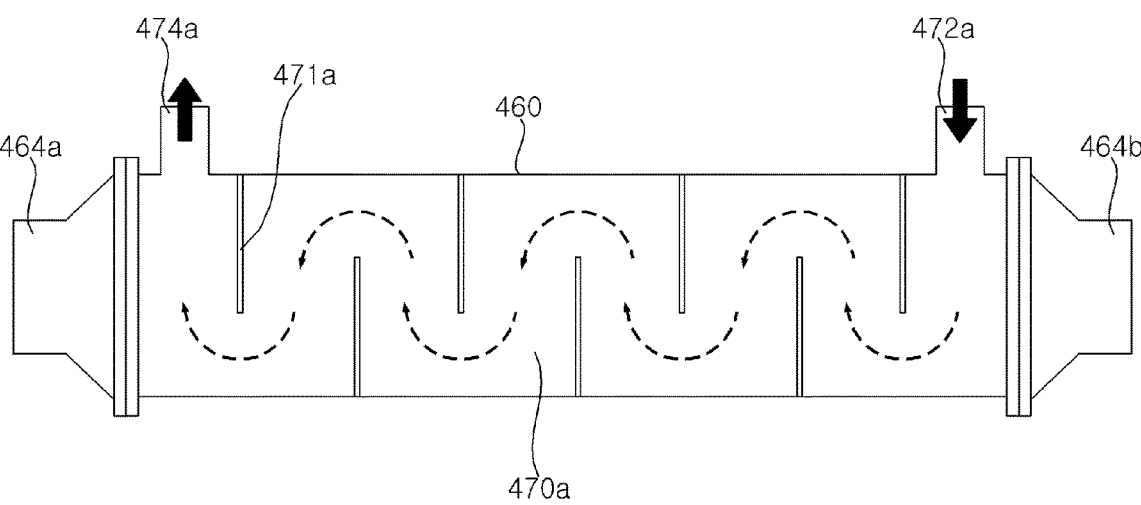
FIG. 8*b* is a schematic cross-sectional view illustrating a fuel flow section of a fuel evaporator.

Referring to FIGS. 8a and 8b, a fuel evaporator according to a first embodiment may have a structure in which a fuel flow section 470a and a gas flow section 462a are formed in a housing 460a having a cylindrical shape. The gas flow section 462a may be composed of a plurality of straight small-diameter pipes 463a. The fuel flow section 470a can exchange heat with the gas flow section 462a through flow bending up and down in the spaces between the small-diameter pipes 463a. A first inlet end 464a and a first outlet end 466a of the gas flow section 462a may be open in a direction parallel with the plurality of small-diameter pipes. A second inlet end 472a and a second outlet end 474a of the fuel flow section 470a may be open in a direction perpendicular to the first inlet end 464a and the first outlet end 466a of the gas flow section 462a. The fuel flow section 470a may include a guider 471a formed in a direction perpendicular to the small-diameter pipes 463a of the gas flow section 462a and increasing a flow area for heat exchange by making a fuel flow up and down.

Figure 9A:
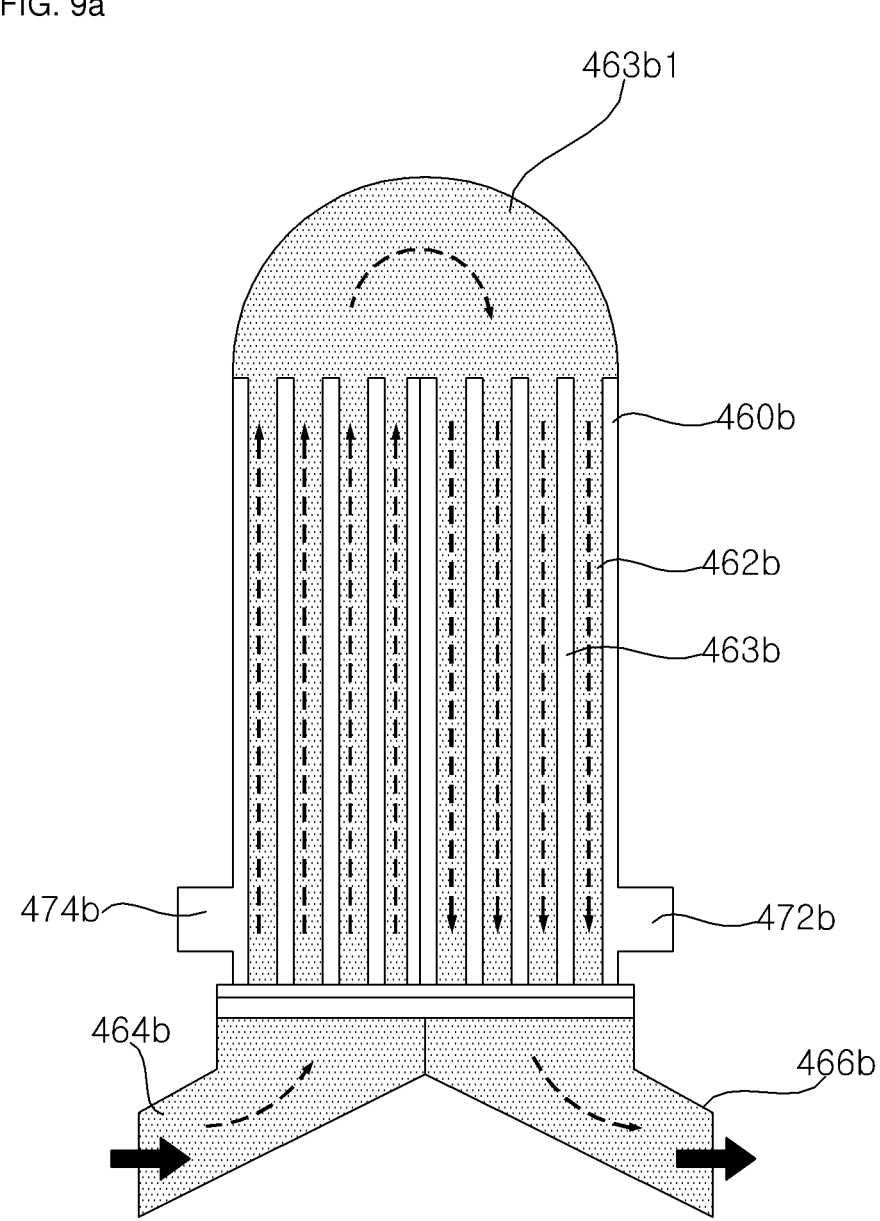
FIG. 9*a* is a schematic cross-sectional view illustrating a gas flow section of a fuel evaporator.
Figure 9B:
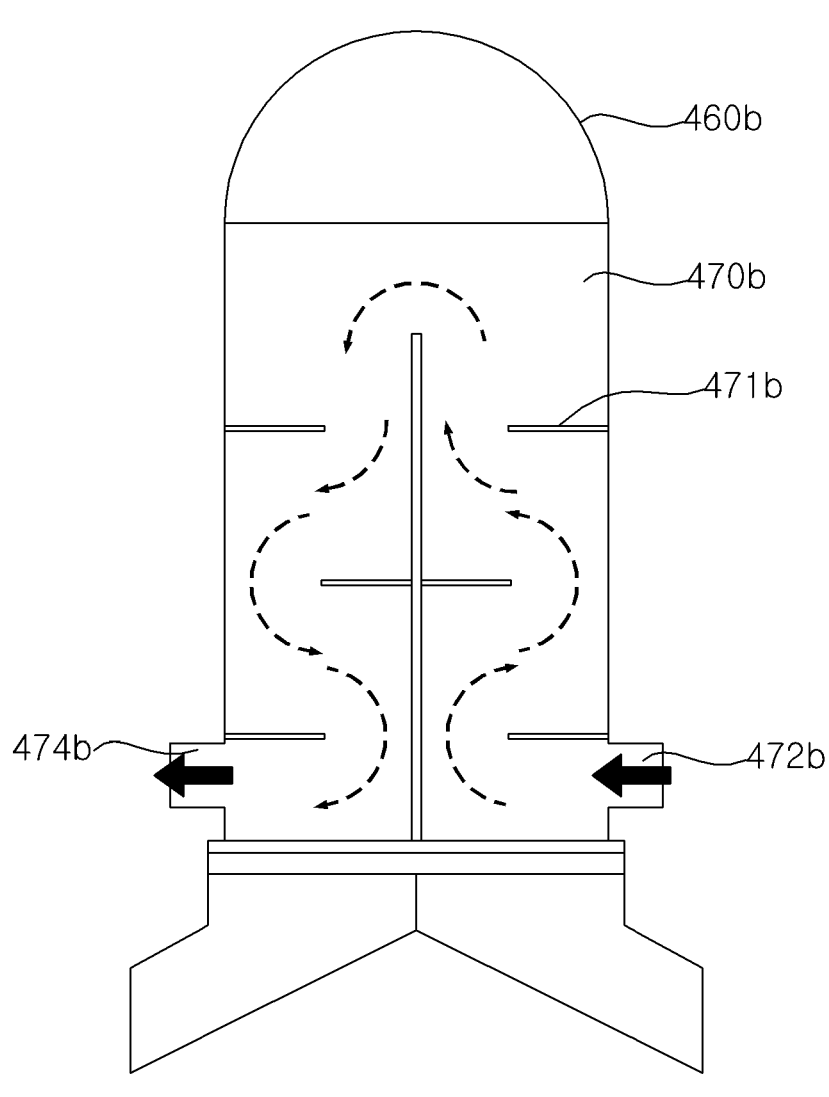
FIG. 9*b* is a schematic cross-sectional view illustrating a fuel flow section of a fuel evaporator.

Referring to FIGS. 9a and 9b, the housing 460b of a fuel evaporator according to a second embodiment may have a structure in which a U-shaped pipe is disposed therein.

A gas flow section 462b may include a plurality of small-diameter pipes 463b formed up and down and a U-shaped bending pipe 463b1 bending over the small-diameter pipes 463b. A first inlet end 464b and a first outlet end 466b of the gas flow section 462b are open in a direction opposite to the direction in which the bending pipe 463b1 is disposed.

A fuel flow section 470b may have a structure flowing through a guider flowing left and right between the plurality of small-diameter pipes 463b. A second inlet end 472b and a second outlet end 474b of the fuel flow section 470b may have a structure protruding in the circumferential direction of the housing 460b.

Figure 10A:
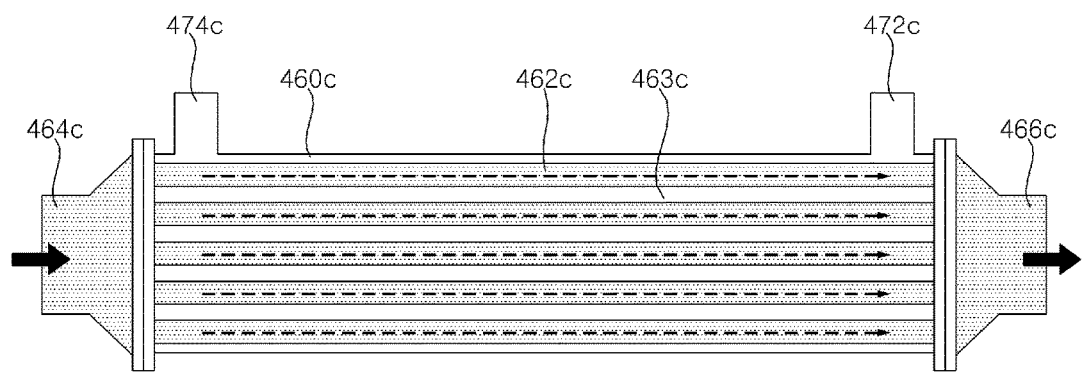
FIG. 10*a* is a schematic cross-sectional view illustrating a gas flow section of a fuel evaporator.
Figure 10B:
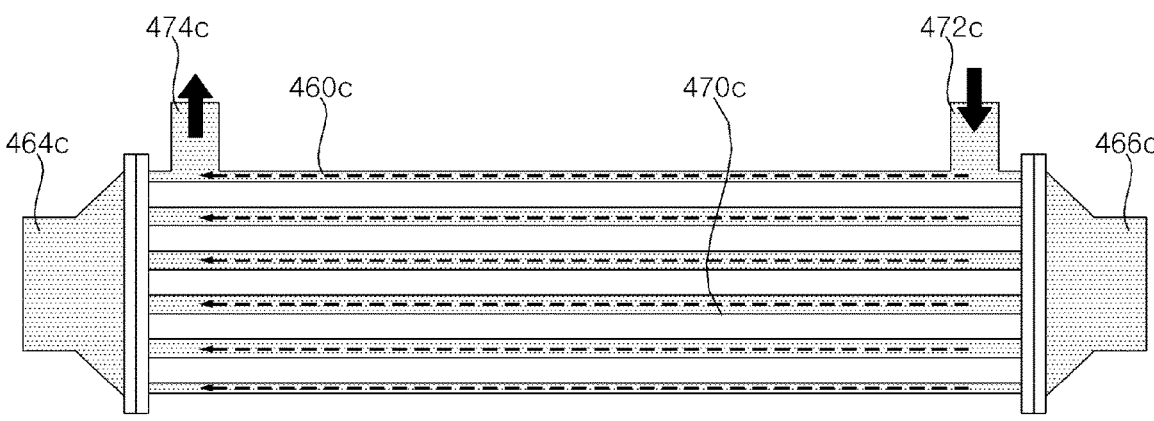
FIG. 10*b* is a schematic cross-sectional view illustrating a fuel flow section of a fuel evaporator.

Referring to FIGS. 10a and 10b, a fuel evaporator according to a third embodiment may have a structure in which a housing 460c has a cylindrical shape and a fuel flow section 470c and a gas flow section 462c are formed therein.

The gas flow section 462c may be composed of a plurality of straight small-diameter pipes. The fuel flow section 470c can exchange heat with the gas flow section 462c through flow of spaces between the plurality of small-diameter pipes. A first inlet end 464c and a first outlet end 466c of the gas flow section 462c may be open in a direction parallel with the plurality of small-diameter pipes. A first inlet end 464c and a first outlet end 466c of the fuel flow section 470c may be open in a direction perpendicular to a second inlet end 472c and a second outlet end 474c of the gas flow section 462c.

Figures 11A, 11B:
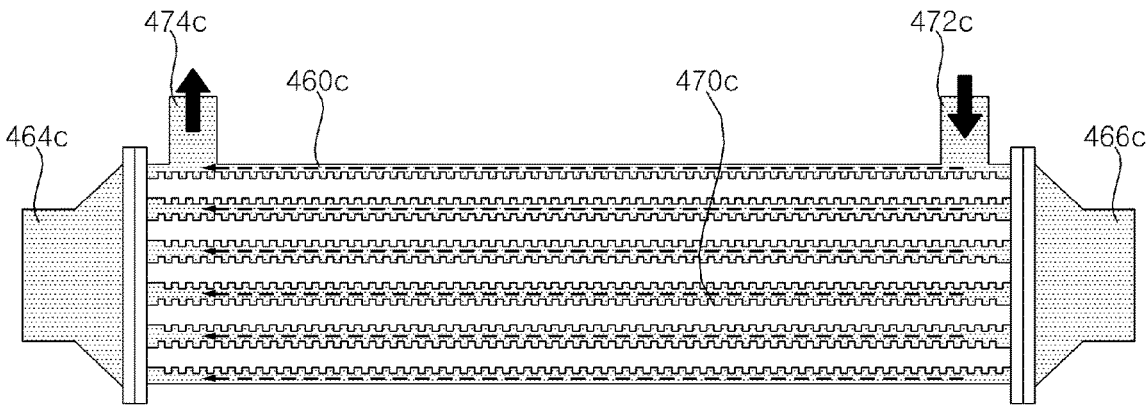
FIGS. 11*a* and 11*b* are views showing the state in which the shape of an internal pipe is changed in FIGS. 10*a* and 10*b*, respectively.

In the evaporator according to the third embodiment, the inside or outside of the pipe of the fuel flow section 470c or the gas flow section 462c, as shown in FIGS. 10a to 10b, may be formed in a flat shape, and as shown in FIGS. 11a to 11b, may be formed in a shape having protrusions.

Figure 12:
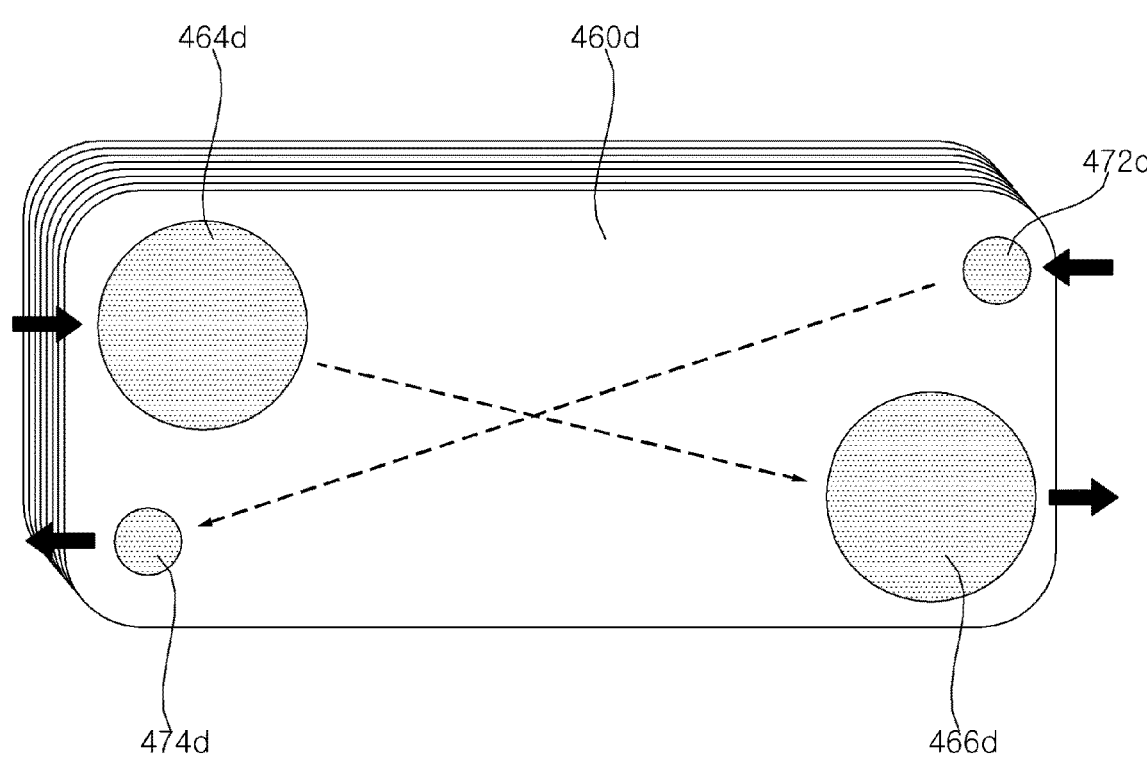
FIG. 12 is a perspective view of a fuel evaporator according to a fourth embodiment of the present disclosure.
Figure 14A:
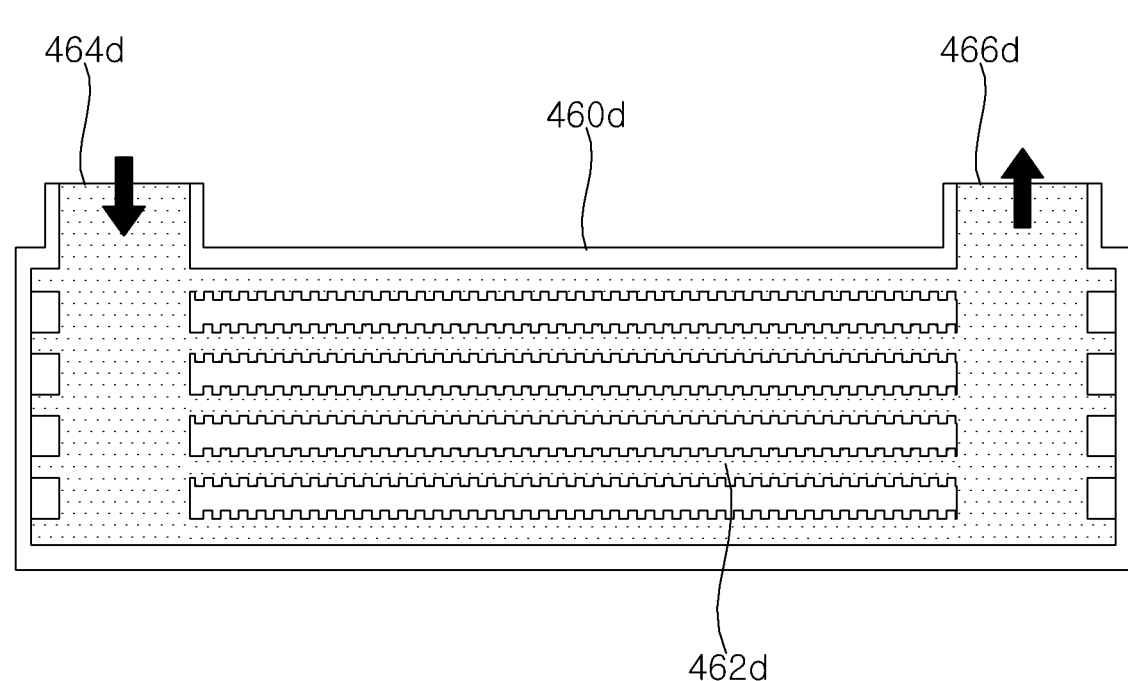
FIGS. 14*a* and 14*b* are views showing the state in which the shape of an internal pipe is changed in FIGS. 13*a* and 13*b*, respectively.
Figure 14B:
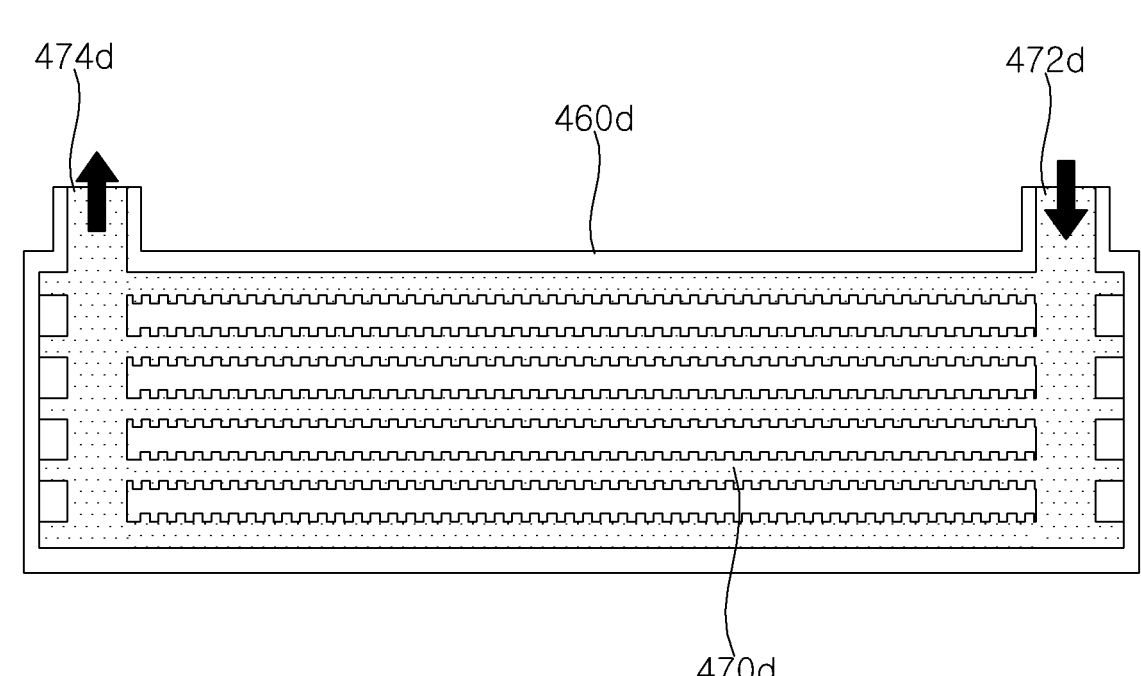

Referring to FIGS. 12 and 14b, a fuel evaporator according to the fourth embodiment may use a plate-type heat exchanger. The fuel evaporator according to the fourth embodiment may have a structure in which a housing 460d has a plate shape and a fuel flow section 470d and a gas flow section 462d are formed therein.

Figure 13A:
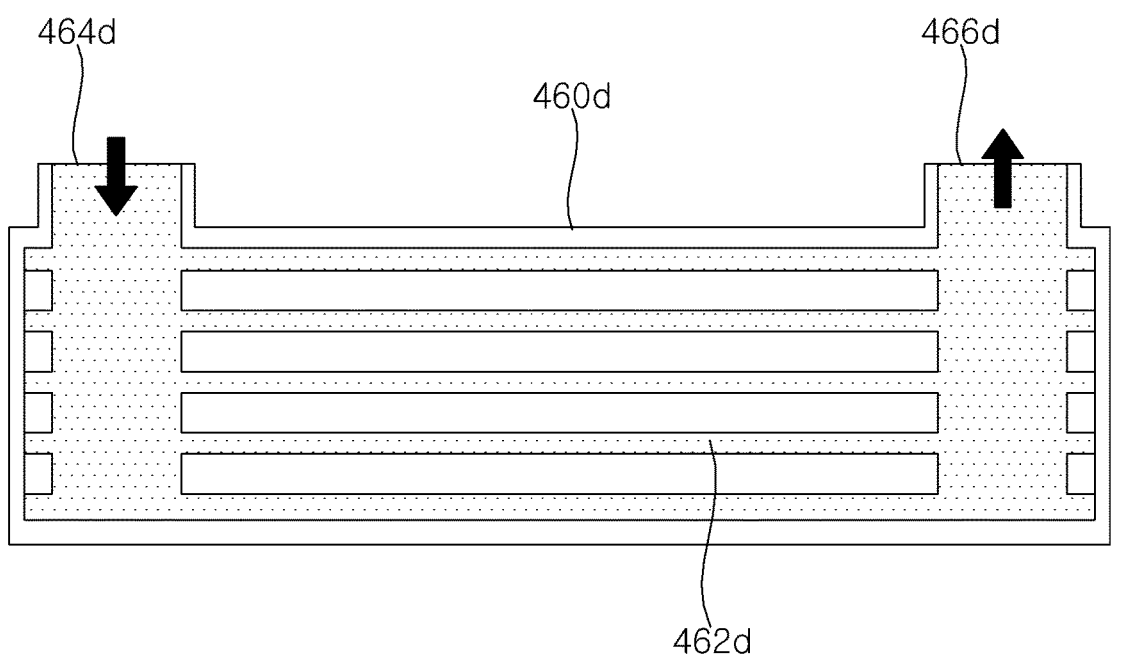
FIG. 13*a* is a schematic cross-sectional view illustrating a gas flow section of a fuel evaporator.

A first inlet end 464 and a first outlet end 466d of the gas flow section 462d are diagonally spaced apart from each other on a side of the housing 460d. Referring to FIGS. 13a and 14a, the gas flow section 462d has a plurality of channels connecting the first inlet end 464d and the first outlet end 466d in the housing 460d. The gas flow section 462d has a plurality of channels formed in a direction perpendicular to the first inlet end 464d and the first outlet end 466d. The plurality of channels formed in the gas flow section 462d may be formed such that the inside of the pipe is flat, as shown in FIG. 13a, or may be formed such that protrusions are formed in the pipe, as shown in FIG. 14a.

Figure 13B:
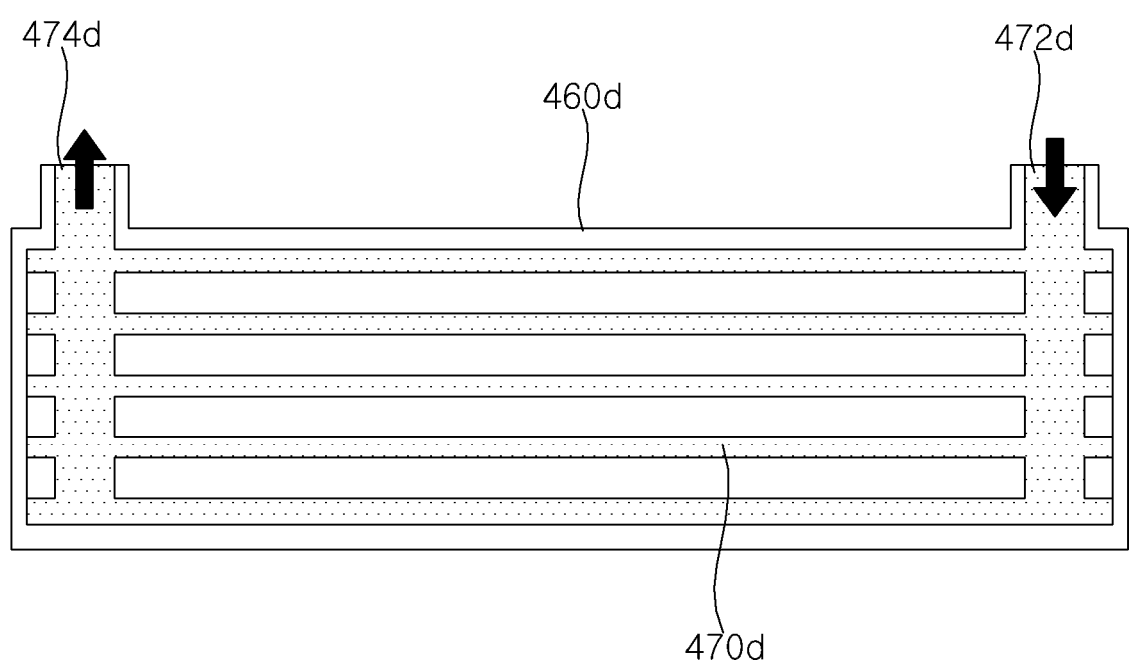
FIG. 13*b* is a schematic cross-sectional view illustrating a fuel flow section of a fuel evaporator.

A second inlet end 472d and a second outlet end 474d of the fuel flow section 470d are diagonally spaced apart from each other on a side of the housing 460d. Referring to FIGS. 13b and 14b, the gas flow section 470d has a plurality of channels connecting the second inlet end 472d and the second outlet end 474d in the housing 460d. The fuel flow section 470d has a plurality of channels formed in a direction perpendicular to the second inlet end 472d and the second outlet end 474d. The plurality of channels formed in the fuel flow section 470d may be formed such that the inside of the pipe is flat, as shown in FIG. 13b, or may be formed such that protrusions are formed in the pipe, as shown in FIG. 14b.

An object of the present disclosure is to provide a fuel cell system that increases the density of air that is supplied to a burner of a reformer using a fuel that is supplied to the reformer.

An object of the present disclosure is to provide a fuel cell system that increases the density of reforming gas that is discharged from a reformer and supplied to a burner using a fuel that is supplied to the reformer.

An object of the present disclosure is to provide a fuel cell system that increases the density of air that is supplied to a stack using a fuel that is supplied to a reformer.

A fuel cell system of the present disclosure includes: a reformer performing a reforming process of producing hydrogen gas from a gasified fuel; a burner supplying heat to the reformer; a stack generating electrical energy by generating an electrochemical reaction using reforming gas and air discharged from the reformer; a first supply pipe supplying external air to the burner; and a second supply pipe supplying external air to the stack.

In order to achieve the objects, the fuel cell system may include: a first storage tank storing a liquid fuel; a second storage tank supplying a gasified fuel to the reformer; and a fuel evaporator making a liquid fuel discharged from the first storage tank exchange heat with air flowing through the first supply pipe or air flowing through the second supply pipe, and sending a gasified gaseous fuel to the second storage tank, in which it is possible to increase the density of air supplied to the stack or air supplied to the burner using coldness and heat of a liquid fuel.

The fuel evaporator may include: a first fuel evaporator configured to enable a liquid fuel discharged from the first storage tank and air flowing through the first supply pipe to exchange heat; and a second fuel evaporator configured to enable a liquid fuel discharged from the first storage tank and air flowing through the second supply pipe exchange heat, so it is possible to cool air supplied to the stack or air supplied to the burner.

The fuel cell system may include: a first liquid gas supply pipe connecting the first storage tank and the first fuel evaporator; a second liquid gas supply pipe connecting the first storage tank and the second fuel evaporator; a first expansion valve disposed in the first liquid gas supply pipe and opening/closing an internal channel of the first liquid gas supply pipe or adjusting the degree of opening of the internal channel; and a second expansion valve disposed in the second liquid gas supply pipe and opening/closing an internal channel of the second liquid gas supply pipe or adjusting the degree of opening of the internal channel, so it is possible to adjust flow of a fuel liquid in accordance with operation modes.

The first expansion valve may expand the internal channel of the first liquid gas supply pipe and the second expansion valve may expand the internal channel of the second liquid gas supply pipe in a preheating mode that preheats the reformer, so it is possible to supply a liquid fuel to a first fuel evaporator disposed in a first supply pipe through which air flows in the preheating mode.

The first expansion valve may increase the degree of opening of the internal channel of the first liquid gas supply pipe and the second expansion valve may increase the degree of opening of the internal channel of the second liquid gas supply pipe in a power generation mode that generates electricity using the stack, so it is possible to cool both air supplied to the stack and air supplied to the burner.

The fuel cells system may include a reforming gas discharge pipe configured to send reforming gas discharged from the reformer to the burner or the stack, and the liquid gas evaporator includes a third liquid gas evaporator disposed in the reforming gas discharge pipe and enabling reforming gas discharged from the reformer and a liquid fuel to exchange heat, so it is possible to cool high-pressure reforming gas discharged from the reformer.

The fuel cell system may include: a third liquid gas supply pipe connecting the first storage tank and the third fuel evaporator; and a third expansion valve disposed in the third liquid gas supply pipe and opening/closing an internal channel of the third liquid gas supply pipe or adjusting the degree of opening of the internal channel, so it is possible to supply a liquid fuel to the third liquid gas evaporator in accordance with operation modes.

The first expansion valve may increase the degree of opening of the internal channel of the first liquid gas supply pipe and the third expansion valve may increase the degree of opening of the internal channel of the third liquid gas supply pipe in a reforming mode that increases the amount of hydrogen included in reforming gas discharged from the reformer, so it is possible to gasify a liquid fuel using gas discharged from the reformer and increase density of reforming gas discharged from the reformer.

The degree of opening of the third expansion valve is larger than the degree of opening of the first expansion valve in the reforming mode, so it is possible to effectively change the phase of a liquid fuel.

The first expansion valve may increase the degree of opening of the internal channel of the first liquid gas supply pipe, the second expansion valve may increase the degree of opening of the internal channel of the second liquid gas supply pipe, and the third expansion valve may increase the degree of opening of the internal channel of the third liquid gas supply pipe in a power generation mode that generates electricity using the stack, so it is possible to gasify a liquid fuel through three fuel evaporator.

The degree of opening of the third expansion valve is larger than the degree of opening of the first expansion valve or the second expansion valve in the power generation mode, so it is possible to effectively change the phase of a liquid fuel.

The fuel cell system may include: a liquid gas common pipe connecting the fuel apparatus, the first liquid gas supply pipe, the second liquid gas supply pipe, and the third liquid gas supply pipe; and a common pipe valve opening/closing the liquid gas common pipe, so it is possible to stably keep a liquid fuel stored in the first storage tank.

The fuel cell system may include: a first blower disposed in the first supply pipe and supplying external air to the first supply pipe; and a second blower disposed in the second supply pipe and supplying external air to the second supply pipe, in which when the first blower is operated, the common pipe valve is opened, so it is possible to discharge the liquid fuel stored in the first storage tank when the fuel cell system is operated.

The fuel evaporator may include: a housing forming an external shape; a fuel flow section disposed in the housing and formed such that a liquid fuel flows; and a gas flow section disposed in the housing and formed such that air or reforming gas flows.

A plurality of protrusions is formed in each of a pipe forming the fuel flow section and a pipe forming the gas flow section, so it is possible to increase a heat exchange area.

According to the fuel cell system of the present disclosure, one or more effects can be achieved as follows.

First, there is an advantage of increasing efficiency of a reforming reaction by increasing the density of air that is supplied to a burner that heats a reformer using coldness and heat generated by a phase change of a liquid fuel.

Second, there is an advantage of increasing reaction efficiency for generating electricity in a stack by increasing the density of air that is supplied to the stack using coldness and heat generated by a phase change of a liquid fuel.

Third, there is an advantage of increasing efficiency of a reforming reaction by increasing the density of reforming gas that is discharged from a reformer and supplied to a burner that heats the reformer using coldness and heat generated by a phase change of a liquid fuel.

The effects of the present disclosure are not limited to those described above and other effects not stated herein may be made apparent to those skilled in the art from claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fuel cell system comprising:
a reformer configured to perform a reforming process that provides hydrogen gas from a gasified fuel;
a burner configured to provide heat to the reformer;
a stack configured to provide electrical energy based on an electrochemical reaction using a reforming gas;
a first supply pipe configured to provide air to the burner;
a second supply pipe configured to provide air to the stack;
a first storage tank configured to store a liquid fuel;
a second storage tank configured to provide the gasified fuel to the reformer;
a reforming gas discharge pipe configured to provide the reforming gas from the reformer to the burner or to the stack;
a first fuel evaporator configured to heat exchange the liquid fuel from the first storage tank with the air flowing through the first supply pipe;
a second fuel evaporator configured to heat exchange the liquid fuel from the first storage tank with the air flowing through the second supply pipe;
a first liquid gas supply pipe to connect the first storage tank and the first fuel evaporator;
a second liquid gas supply pipe to connect the first storage tank and the second fuel evaporator;
a first expansion valve disposed at the first liquid gas supply pipe, and configured to open or close an internal channel of the first liquid gas supply pipe or to adjust a degree of opening of the internal channel of the first liquid gas supply pipe;
a second expansion valve disposed at the second liquid gas supply pipe, and configured to open or close an internal channel of the second liquid gas supply pipe or to adjust a degree of opening of the internal channel of the second liquid gas supply pipe; and
a third fuel evaporator disposed at the reforming gas discharge pipe, the third fuel evaporator being configured to heat exchange the reforming gas from the reformer with the liquid fuel.

2. The fuel cell system of claim 1, wherein while the system is in a preheating mode that preheats the reformer, the first expansion valve is to increase the degree of opening of the internal channel of the first liquid gas supply pipe and the second expansion valve is to close the internal channel of the second liquid gas supply pipe.

3. The fuel cell system of claim 1, wherein while the system is in a power generation mode that generates electricity using the stack, the first expansion valve is to increase the degree of opening of the internal channel of the first liquid gas supply pipe and the second expansion valve is to increase the degree of opening of the internal channel of the second liquid gas supply pipe.

4. The fuel cell system of claim 1, comprising:
a third liquid gas supply pipe to connect the first storage tank and the third fuel evaporator; and
a third expansion valve disposed at the third liquid gas supply pipe, and configured to open or close an internal channel of the third liquid gas supply pipe or to adjust a degree of opening of the internal channel of the third liquid gas supply pipe.

5. The fuel cell system of claim 4, wherein the first expansion valve and the third expansion valve are configured to increase the degree of opening of the internal channel of the first liquid gas supply pipe the internal channel of the third liquid gas supply pipe in response to a reforming mode of the system, the reforming mode being configured to increase an amount of hydrogen included in the reforming gas from the reformer.

6. The fuel cell system of claim 3, wherein the third expansion valve is configured to define a size of the internal channel of the third liquid gas supply pipe that is larger than a size of the internal channel of the first liquid gas supply pipe defined by the first expansion valve when the system is in the reforming mode.

7. The fuel cell system of claim 1, wherein the first expansion valve and the third expansion valve are configured to increase the degree of opening of the internal channel of the first liquid gas supply pipe, the second liquid gas supply pipe, and third liquid gas supply pipes in response to a power generation mode of the system, the power generation mode being configured to generate electricity using the stack.

8. The fuel cell system of claim 7, wherein the third expansion valve is configured to define a size of the internal channel of the third liquid gas supply pipe that is larger than a size of the internal channel of the first liquid gas supply pipe or a size of the internal channel of the second liquid gas supply pipe when the system is in the power generation mode.

9. The fuel cell system of claim 4, comprising:
a liquid gas common pipe to connect the first storage tank, the first liquid gas supply pipe, the second liquid gas supply pipe, and the third liquid gas supply pipe; and
a common pipe valve configured to open or close the liquid gas common pipe.

10. The fuel cell system of claim 9, comprising:
a first blower disposed at the first supply pipe, and configured to provide external air to the first supply pipe; and
a second blower disposed at the second supply pipe, and configured to provide external air to the second supply pipe,
wherein when the first blower is operated, the common pipe valve is to open the liquid gas common pipe.

11. The fuel cell system of claim 1, wherein the third fuel evaporator includes:

a housing;

a fuel flow section disposed in the housing, and configured to allow the liquid fuel to flow; and a gas flow section disposed in the housing, and configured to allow flow of air or the reforming gas.

12. The fuel cell system of claim 11, wherein a pipe of the fuel flow section includes a plurality of protrusions within the pipe of the fuel flow section, and a pipe of the gas flow section includes a plurality of protrusions within the pipe of the gas flow section.

13. A fuel cell system comprising:

a reformer configured to perform a reforming process that provides a reforming gas;

a burner configured to provide heat to the reformer;

a stack configured to receive the reforming gas and to perform an electrochemical reaction to the received reforming gas;

a first supply channel configured to provide air to the burner;

a second supply channel configured to provide air to the stack;

a first storage tank configured to provide a liquid fuel;

a second storage tank configured to provide a gasified fuel; and a fuel evaporator in which the liquid fuel from the first storage tank is exchanged with air from the first supply channel or with air from the second supply channel, and the fuel evaporator is to provide a gaseous fuel based on the exchange, wherein the fuel evaporator includes:

a first fuel evaporator configured to perform a heat exchange of the liquid fuel from the first storage tank with the air flowing through the first supply channel; and a second fuel evaporator configured to perform a heat exchange of the liquid fuel from the first storage tank with the air flowing through the second supply channel, and wherein the fuel cell system further comprises:

a first liquid gas supply channel to connect the first storage tank and the first fuel evaporator;

a second liquid gas supply channel to connect the first storage tank and the second fuel evaporator;

a first expansion valve disposed at the first liquid gas supply channel, and configured to open or close the first liquid gas supply channel or to adjust a degree of opening of the first liquid gas supply channel; and a second expansion valve disposed at the second liquid gas supply channel, and configured to open or close the second liquid gas supply channel or to adjust a degree of opening of the second liquid gas supply channel.

\* \* \* \* \*